United States Patent [19]

Purdy et al.

[11] Patent Number: 4,757,714
[45] Date of Patent: Jul. 19, 1988

[54] SPEED SENSOR AND HEAD-MOUNTED DATA DISPLAY

[75] Inventors: Peter K. Purdy; Kirk W. Beach, both of Seattle, Wash.

[73] Assignee: Insight, Inc., Kirkland, Wash.

[21] Appl. No.: 36,826

[22] Filed: Apr. 10, 1987

Related U.S. Application Data

[63] Continuation-in-part of Ser. No. 911,573, Sep. 25, 1986.

[51] Int. Cl.$^4$ .............................................. G01H 5/00
[52] U.S. Cl. .................................... 73/597; 324/160
[58] Field of Search ................. 73/597, 490, 493, 527; 324/160; 364/565

[56] References Cited

U.S. PATENT DOCUMENTS

| | | |
|---|---|---|
| 3,505,878 | 4/1970 | Moll .................................... 73/490 |
| 4,262,537 | 4/1981 | Jander et al. ......................... 73/490 |
| 4,495,589 | 1/1985 | Hirzel ............................. 324/160 X |
| 4,546,650 | 10/1985 | Cameron ............................ 73/490 |

FOREIGN PATENT DOCUMENTS 3404032 8/1985 Fed. Rep. of Germany ........ 73/527

OTHER PUBLICATIONS

Article Titled "Modulation Schemes in Low-Cost Microwave Field Sensors" Beginning at p. 612 of *IEEE Transactions on Microwave Theory and Techniques*, vol. MTT-31, No. 8, Aug. 1983. Avail. from Institute of Electrical and Electronics Engineers.

*Primary Examiner*—Jerry W. Myracle
*Attorney, Agent, or Firm*—Ward Brown; Robert W. Beach

[57] ABSTRACT

A transmitter is mounted for movement with a skier or other self-propelled sportsman and transmits ultrasonic or electromagnetic waves toward the stationary medium over which the skier or sportsman is moving. An element of the same transmitter or a separate transducer detects waves reflected from the stationary medium. A computer calculates the speed of the skier or sportsman from the Doppler shift of the reflected waves and actuates a readout unit to indicate the speed to the skier or sportsman. The readout system has a head-mounted display including a character generator and a semitransparent reflector in which the character generator is viewed so that the speed indication appears superposed over the normal background in the viewing direction.

18 Claims, 6 Drawing Sheets

SPEED SENSOR AND HEAD-MOUNTED DATA DISPLAY

CROSS REFERENCE

This application is a continuation-in-part of commonly assigned copending application Ser. No. 911,573, filed Sept. 25, 1986, in the names of Peter K. Purdy and Kirk W. Beach, titled Ski Speedometer.

BACKGROUND OF THE INVENTION

1. Field of the Invention

The present invention relates to speedometers and odometers and to data display systems. More specifically, the present invention relates to a speedometer-odometer for a skier or other moving sportsman and to a head-mounted display for the speed-distance information. The display also can be used for other types of data of interest to the wearer.

2. Prior Art

Moll U.S. Pat. No. 3,505,878, issued Apr. 14, 1970, discloses a "Speed and Distance Indicator for a Ski Device". Jander et al. U.S. Pat. No. 4,262,537, issued Apr. 21, 1981, discloses a "Speedometer and/or Odometer for Skiers". Cameron U.S. Pat. No. 4,546,650, issued Oct. 15, 1985, discloses a "Speed and Distance Calculator for Skis". Each of the devices described in these patents uses one or more wheels mounted on the ski for rotation about a horizontal axis and rotated by contact with the medium over which the ski is traveling, namely, the snow or water, and a speed indicator or display incorporated in the ski-mounted unit.

SUMMARY OF THE INVENTION

It is a first object of the present invention to provide a speedometer-odometer of simple, inexpensive, yet sturdy and reliable construction for use in connection with a sportsman moving relative to a surrounding surface or medium. In accordance with such object, it is an object to provide such a speedometer-odometer adaptable for use by a skier.

A second object is to provide a convenient system for displaying the speed-distance information or other data of interest to the sportsman or another user of the display system.

In accordance with the present invention, the first object is accomplished by mounting wave-transmitting and echo or backscatter wave-receiving mechanism substantially stationarily relative to the sportsman; and by providing mechanism for measuring the difference between the frequency of transmitted waves and waves reflected from the medium for calculating the speed of the sportsman relative to the stationary medium in accordance with the Doppler effect. A computer processes a signal generated by the receiving mechanism and can actuate a display of current speed on a readout unit. The computer can have an internal clock and be programmed to calculate information on the distance traveled as well as speed information.

The second object is accomplished by a data display system which can be driven by the computer or other data generator and which preferably includes a head-mounted, semitransparent reflector disposed in the user's field of vision. The data viewed in the reflector appears superimposed on the background in the viewing direction. Preferably, the apparent optical distance of projection of the data characters beyond the reflector is as great as possible for easy focusing on the data characters and background simultaneously or almost simultaneously.

DETAILED DESCRIPTION

Figures 1, 2:
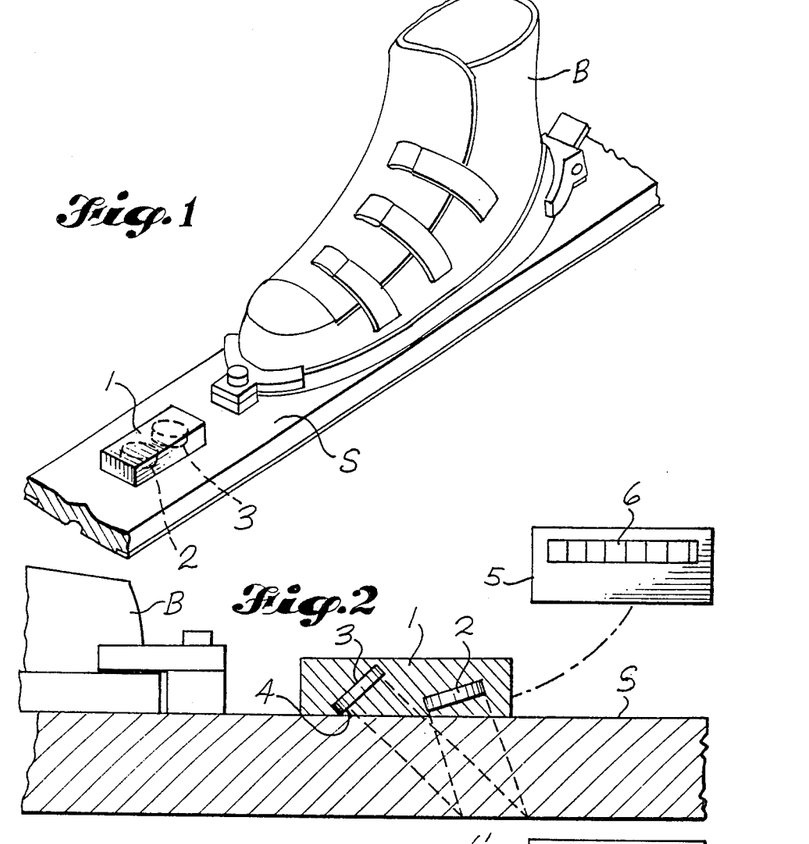
FIG. 1 is a very diagrammatic, fragmentary, top perspective of a snow ski having components of a speed sensor in accordance with the present invention.
FIG. 2 is an enlarged diagrammatic side elevation of a portion of the ski of FIG. 1, with parts shown in section.

In the embodiment shown in FIGS. 1 and 2, the speed sensor in accordance with the present invention includes a block 1 mounted on the top surface of a snow ski S having the usual bindings for a ski boot B. As best seen in FIG. 2, the block 1 mounts a transducer 2 stationarily relative to the ski S for transmitting ultrasonic waves of a known, preferably constant, frequency downward through the block and also through the ski itself. In the illustrated embodiment, the ultrasound waves are transmitted downward and forward at a small acute angle to vertical.

A receiving transducer 3 is mounted rearward from the transmitting transducer 2 in the block 1. Ultrasonic waves reflected from the medium over which the ski is traveling impinge on the flat bottom face 4 of the receiving transducer 3 which generates a corresponding electrical signal. Preferably, the flat bottom face 4 of the receiving transducer 3 is positioned perpendicular to waves reflected at the bottom of the ski. As illustrated in broken lines in FIG. 2, waves perpendicular to the transducer faces at their opposite side edges intersect, respectively, precisely at the bottom of the ski. In the arrangement shown, the receiving transducer is inclined more sharply than the transmitting transducer.

Given the known angles of the transmitting and receiving transducers 2 and 3 and the known constant frequency of the transmitted ultrasound waves, the speed of the ski relative to the stationary supporting medium can be calculated once the frequency of reflected waves is detected. Preferably, the calculation is performed by a computer 5 having a readout or display 6 and mounted on the ski. Optionally, the computer can be mounted on the ski boot and have a conveniently detachable cable connectible to the transducer block 1. The computer also could be carried by the skier, in which case the readout could be a separate unit mounted, for example, on a wrist band or in the skier's helmet or goggles. The transducers and the detecting-calculating mechanism can be similar to that used in medical Doppler blood flowmeters.

The computer is programmed to calculate the speed of the ski relative to the supporting medium and display it on the readout 6. Preferably the computer has an internal clock so that optionally or additionally distance traveled also can be displayed. The computer can be provided with memory and programmed to display current speed, average speed, maximum speed, current acceleration, maximum acceleration, trip distance, cumulative distance, trip time, total or cumulative time, air time (i.e., the time for which the ski bottom was not in contact with the supporting medium) or time of day.

Figure 3:
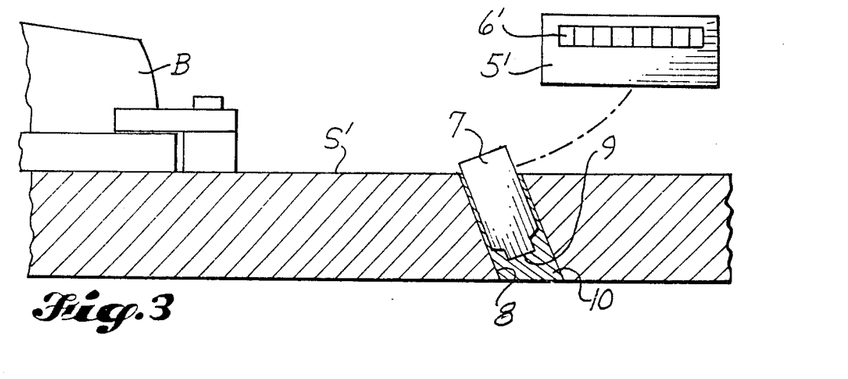
FIG. 3 is a diagrammatic side elevation corresponding to FIG. 2 illustrating an alternative embodiment of a speed sensor in accordance with the present invention.

In the alternative embodiment shown in FIG. 3, a single transducer 7 is mounted in a cavity 8 in the ski S'. Such transducer is of the "pulsed-Doppler" type, alternately transmitting ultrasonic waves and receiving reflected waves. Its transmitting-receiving face 9 is angled downward and forward. The bottom portion of the cavity can be filled with a suitable medium 10 for conducting ultrasonic waves such that the form shown in FIG. 3 is particularly adapted to a ski of a type which will not otherwise transmit ultrasonic waves. The computer 5' with readout 6' controls the transducer and performs the calculations as in the previously described embodiment.

Figure 4:
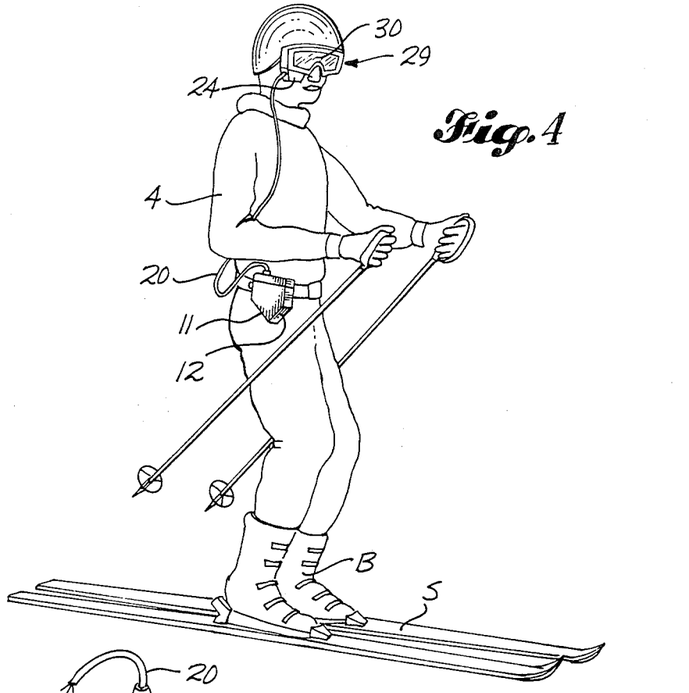
FIG. 4 is a diagrammatic perspective of a skier having another embodiment of a speed sensor and also a head-mounted data display in accordance with the present invention.
Figure 5:
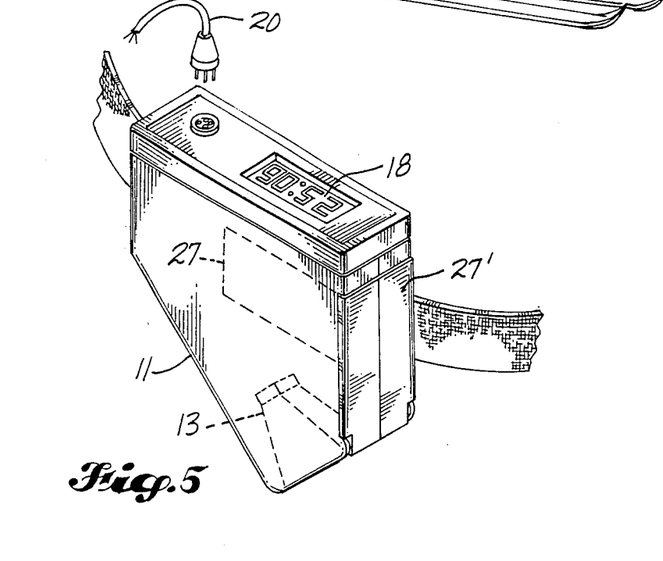
FIG. 5 is a somewhat diagrammatic top perspective of the speed sensor component of the invention as shown in FIG. 4.

While the embodiments shown in FIGS. 1, 2 and 3 use ultrasound transducers, the alternative embodiment shown in FIGS. 4 and 5 utilizes an electromagnetic wave transceiver which is portable and mounted in a small casing 11. The casing, in turn, is mountable on a ski S, a ski boot B or on the skier. As seen in FIG. 4, the casing can be carried by a belt for attachment to the skier approximately waist high. The position of the casing 11 should be substantially constant.

The transceiver preferably includes an oscillator transmitting waves in the superhigh frequency range of 3 gigahertz to 30 gigahertz. In a representative embodiment, the oscillator can be a negative resistance diode oscillator of the general type described in the article titled "Modulation Schemes in Low-Cost Microwave Field Sensors" beginning at page 613 of *IEEE Transactions on Microwave Theory and Techniques*, Vol. MTT-31, No. 8, August 1983, available from the Institute of Electrical and Electronics Engineers. See also the references to that article listed at page 623. Such article and references are expressly incorporated by reference herein.

Figure 6:
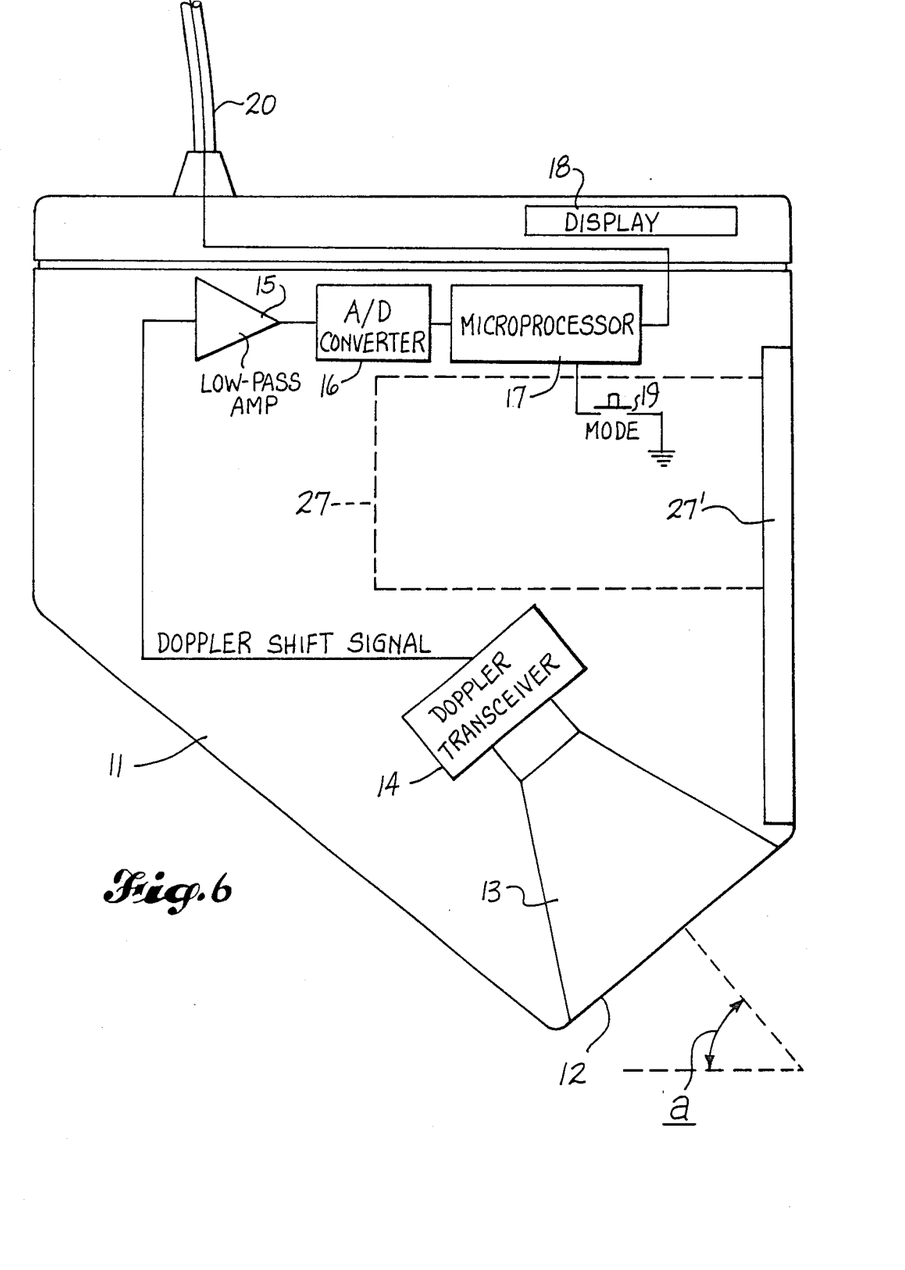
FIG. 6 is a block circuit diagram of the speed sensor in accordance with the present invention.

The casing 11 contains a lower leading edge portion 12 from which waves are transmitted downward and forward through the air. As represented in FIG. 6, such waves can be transmitted by the transceiver 14 through the wave guide antenna 13, which is also shown diagrammatically in broken lines in FIG. 5, at a range of angles relative to horizontal for which the median angle is perpendicular to the casing end edge 12. In the preferred embodiment, the median transmission angle is 45 degrees. Waves backscattered from the ground pass through the wave guide antenna to impinge on the diode which serves as both the oscillator of the transmitter and as a mixer in the receiver. A "Doppler shift signal" indicative of the difference between the transmission frequency and the frequency of the received backscattered waves is fed to a low-pass amplifier 15. In a representative embodiment utilizing a transmission frequency of 10.525 gigahertz, the Doppler shift signal fed to the low-pass amplifier will have a median frequency of about 22 hertz times the actual speed of the skier relative to the ground in miles per hour.

The cutoff frequency of the low-pass amplifier 15 is selected to eliminate high-frequency noise, such as noise of a frequency higher than the maximum possible speed of the skier.

The signal from the low-pass amplifier 15 is fed to an analog to digital converter 16 for processing by a microprocessor 17. Representative of the conventional microprocessor which can be used is the Intel 80C51. The microprocessor is programmed for frequency analysis of the digitized input signal. For example, the microprocessor can be programmed to apply a fast Fourier transform frequency analysis of the digitized input signal frequencies to calculate the energy of discrete frequency components. The backscattered received waves are composed of signal energies coming from different angles and, consequently, result in a nonmonochromatic Doppler shift signal, just as the angles of transmitted waves relative to the skier and the ground encompass a range of angles. Nevertheless, the median-transmitted angle is known, namely, 45 degrees in the preferred embodiment, and the microprocessor is programmed to calculate the median "shifted" frequency of the incoming digital signal from the converter 16, that is, the frequency for which one-half of the total incoming energy results from components of higher frequencies and one-half results from components of lower frequencies. Such median shifted frequency is used to calculate an approximation of the actual speed in accordance with Doppler techniques. The microprocessor then actuates a display 18 which can be, for example, an LCD or LED display carried by the casing 11 as seen in FIG. 5.

A switch 19 represented in FIG. 6 can be provided for selecting different modes of the microprocessor for displaying other information such as distance traveled, elapsed time, average speed, time of day and so on. Power can be supplied by batteries carried in a cavity 27 of the casing 11 accessible by opening a door 27'.

Speed, distance and related information is of interest to sportsmen other than Alpine skiers, and modifications in the microprocessor programming can adapt the speed sensor in accordance with the present invention for other sportsmen. For a Nordic or cross-country skier with a speed sensor of the general type represented in FIG. 6 but mounted on the skier's boot or ski, there would be some rearward motion in addition to forward motion. The microprocessor can be programmed in conjunction with an inertia switch or direction sensitive Doppler elements to calculate and display aggregate forward distance by subtracting the reverse motion component and, similarly, can be programmed to display average forward speed over a desired period. A runner or hiker may be as interested in distance and average speed rather than instantaneous speed and the microprocessor can be programmed to calculate that information and actuate the display on demand.

Figure 7:
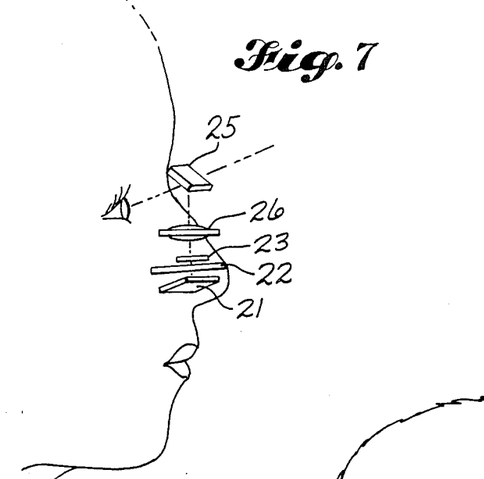
FIG. 7 is a diagrammatic side elevation illustrating components of the head-mounted data display of the embodiment of the invention shown in FIG. 4.

With reference to FIGS. 4 and 5, in lieu of or in addition to the unit-mounted display 18, the microprocessor can supply the data signal to a remote display such as through a cable 20 or through electromagnetic radio transmission, or ultrasonic transmission to a user-mounted or stationary display or receiving device. In accordance with the present invention, preferably such remote display is head-mounted, for example, incorporated in eye wear or headgear, such as goggles 29, so as to be movable with the viewer's head. The basic components carried by the eye wear or headgear of a representative system are best seen in FIG. 7. Preferably, there is a transmissive, white, diffusing filter 21 exposed to ambient light and adjacent to a conventional internal backing 22 for a liquid crystal plate 23. Preferably, such plate is in transmissive mode so that, when driven, data characters are transparent on a dark background. Ambient light then acts as an auto-contrast control because the brighter the ambient light, the brighter the characters will appear. Alternatively, the filter, backing and liquid crystal plate can be replaced by active elements such as light-emitting diodes, but a liquid crystal display in transmissive mode is preferred.

Preferably, elements 21, 22 and 23 are carried by the eye wear or headgear out of the field of vision of the user such as in a lower goggle extension 24 shown in FIG. 4. The image of the display is viewable in a flat reflector 25 located above the user's eye outside the usual forward or forward and downward direct line of vision but within the peripheral field of view and easily seen. The head-mounted construction is extremely convenient because it allows data to be viewed without movement of the head and with at most only momentary distraction from the desired direct line of sight. There can be a complication because of the necessarily close positioning of the reflector 25 to the eye such that the eye does not easily change focus from the background to the closer displayed characters and back again. Preferably there is an optical element such as a lens 26 to increase the apparent optical distance of the characters from the eye to at least several times the actual physical distance of the path from the eye to the reflector to the display. The apparent optical distance to the characters should be at least 10 inches to 12 inches (25.40 cm 30.48 cm) but less than infinity in front of the eye. The projection of the characters to such distance makes focusing much easier and quicker and less tiring to the eye. Placing the characters at a great distance allows viewing the characters with little focal adjustment of the eye.

In addition, preferably the reflector is semitransparent such as a half-silvered mirror or a pellicle of the type used for beam splitting. The result is that the reflected display characters are clearly visible, but the background is not completely obscured. When used in the preferred method of incorporation into eye wear having a darkened or polarized or tinted front lens 30, the data characters appear to be projected onto the background.

Figures 8, 9:
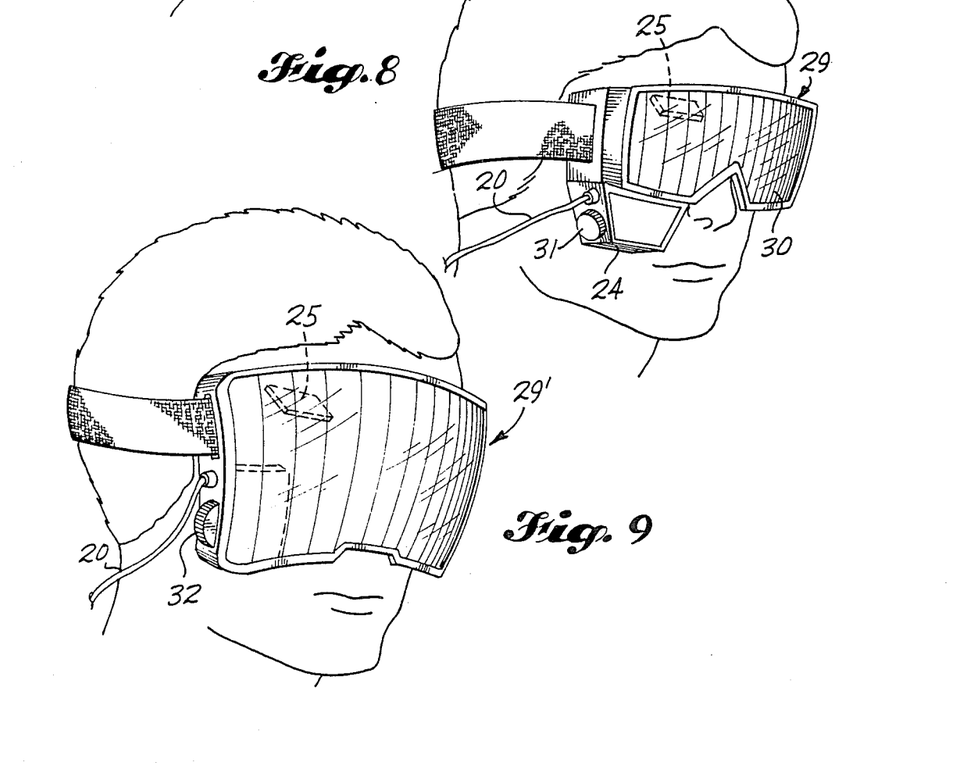
FIGS. 8 and 9 are corresponding perspectives of different embodiments of head-mounted data displays in accordance with the present invention such as would be incorporated in goggles for a skier.

The embodiment illustrated in FIG. 8 corresponds to the embodiment shown in FIG. 4 where the character-generating elements of the display are carried in the goggle extension 24. The semitransparent planar reflector 25 is mounted toward the top of the goggles 29, inside the outer lens 30, slightly higher than the eye. The elements for measuring the optical distance can be mounted at approximately the junction of the bottom edge of the goggles 29 and the top edge of the extension 24. Button 31 can be used to actuate the microprocessor to change to a desired mode.

In the embodiment shown in FIG. 9, all of the display elements are mounted inside the wider goggles 29'. Dial 32 is usable to select the mode and the display characters are viewed on the planar half-silvered mirror or pellicle 25.

Figure 10:
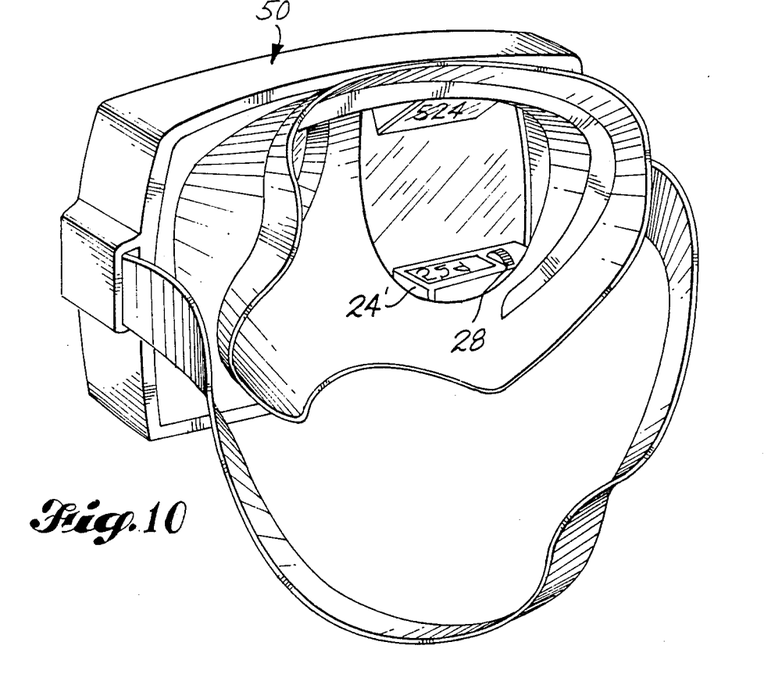
FIG. 10 is a diagrammatic rear perspective of another embodiment of head-mounted data display as incorporated in a mask such as would be used by a scuba diver.

FIG. 10 illustrates a display in accordance with the present invention as incorporated in a mask 50 of the type used by scuba divers. As in the embodiment shown in FIG. 8, there is a bottom housing 24' containing the character-generating mechanism which, in the case of the embodiment of FIG. 10, includes a dial 28 for adjusting the angle of the LCD or LED plate. Data to be displayed can be generated by a remote microprocessor and can including information on the depth or pressure or time of remaining air supply, for example.

Figure 11:
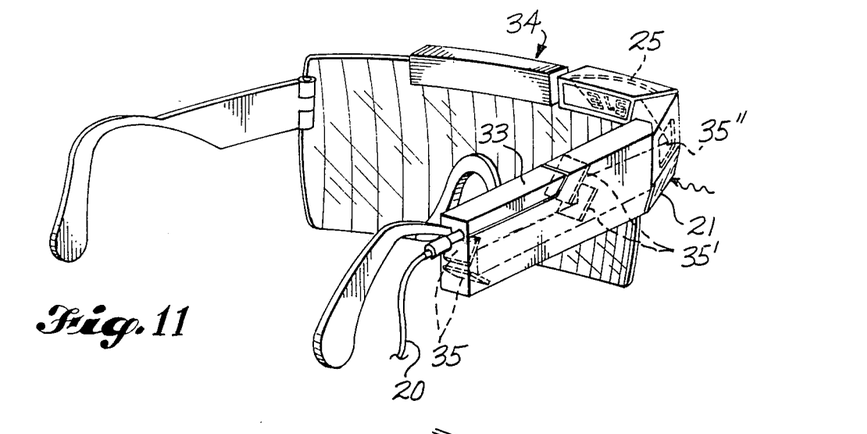
FIG. 11 is a diagrammatic rear perspective of another embodiment of head-mounted data display in accordance with the present invention as incorporated in eye wear for a sportsman or other user.

FIG. 11 illustrates another embodiment more closely resembling a pair of sunglasses than a skier's or sportsman's goggles. The light diffusing filter 21 is positioned at the forward end of one sidepiece 33 of the frame 34. The LCD character generator controlled by the cable 20 from the computer is located immediately adjacent to the filter 21 inside the sidepiece 33. By using several internal planar reflectors 35, 35' and 35", the length of the path from the character generator to the viewing reflector 25' is increased substantially, as indicated in broken lines. Light enters through the bottom front of the sidepiece 33 and through the transmission LCD plate. From the plate, the passed light travels rearward the full length of the sidepiece to a pair of cooperating planar reflectors 35, the back forward to a central pair 35' positioned to offset the light beams upward. The light proceeds forward and to an additional planar reflector 35" positioned toward the top of the sidepiece 33 at its front to direct the light substantially horizontally inward. In the embodiment shown in FIG. 11, the viewing reflector 25', which still is preferably semitransparent, can be shaped to magnify the image of the display characters for more convenient viewing.

Figure 12:
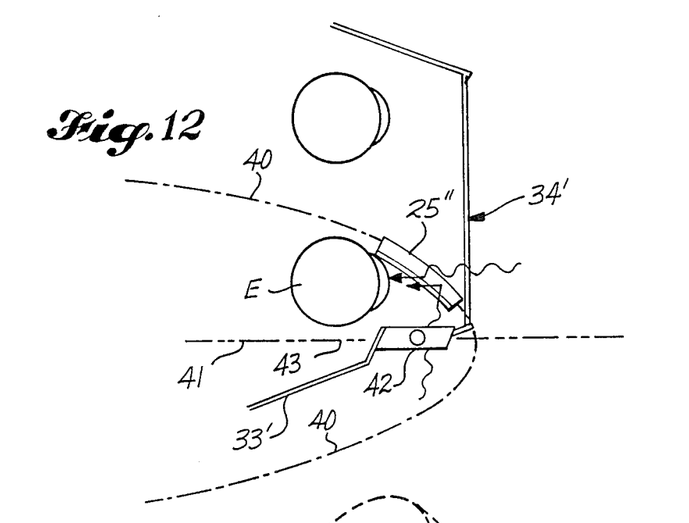
FIG. 12 is a diagrammatic top plan of another embodiment of head-mounted data display in accordance with the present invention utilizing a segment of a parabolic reflector.
Figure 13:
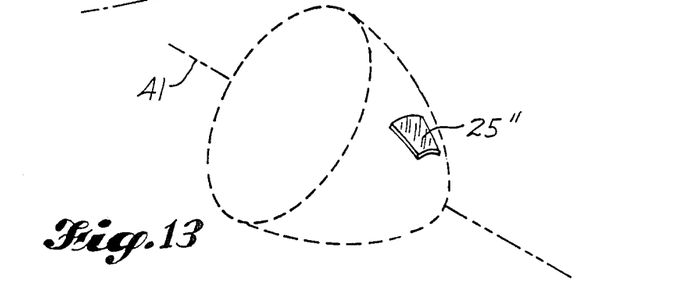
FIG. 13 is a diagrammatic perspective of the reflector used in the embodiment of FIG. 12, illustrating the surface of revolution of which such reflector is a segment.

The optical distance from the display generator to the eye also can be increased by using a reflector of complex shape. In the embodiment shown diagrammatically in FIG. 12, a horizontal section of the reflector 25" is a segment of a parabola which, if more fully complete, would continue along the broken line path 40. The full reflector surface preferably is a three-dimensional concave segment of a paraboloid formed by rotation of the parabola about the horizontal axis 41 as best seen in FIG. 13. Such axis intersects or is closely adjacent to the character generator such as the liquid crystal plate 42 carried on a sidepiece 33' of eye wear 34'. Preferably, the parabolic focus 43 is centered in the character generator or closely adjacent to it, in which case the optical distance at which the eye E will focus will be very long, i.e., close to infinity.

The reflector can be a short strip positioned slightly above the eye, as in the previously described embodiments, or can completely cover the normal field of view. In the embodiment shown in FIG. 12 the entire field of view is covered by reflector 25" so that viewing of the background is necessarily through the semitransparent reflector regardless of whether or not the line of sight is directly at the reflection of the displayed characters. When the entire field of view is covered by the reflector, corresponding reflectors can be placed at both sides of the eye wear even if only one of them is used for character display. The embodiment shown in FIGS. 12 and 13 is particularly effective in creating the illusion of projection of the data onto the surrounding background. The visibility of the characters can be increased by the use of color-compensating filter material which can be incorporated in the lenses or otherwise such as sheet 44 shown in FIG. 12 located at the opposite side of the reflector from the eye. The visual effect is to enhance or remove color components of the background differently from the reflected characters. Preferably, color components of light transmitted through the LCD plate are not filtered so that the display characters are as bright as possible, in which case all color compensation for increasing the visibility of the reflected data is by color filtering elements disposed opposite the semitransparent reflector from the eye.

We claim:

1. A speedometer for a self-propelled sportsman moving by his or her own force or momentum along a stationary medium comprising means mounted for movement with the sportsman for transmitting waves toward the stationary medium and for detecting such waves reflected from the stationary medium, means mounted for movement with the sportsman for measuring the difference in frequency between the transmitted and reflected waves in accordance with the Doppler effect, means mounted for movement with the sportsman for calculating the speed of the sportsman from such frequency difference, and means mounted for movement with the sportsman for indicating such speed.

2. The speedometer defined in claim 1, in which the wave-transmitting means includes means for transmitting electromagnetic waves through the air toward the stationary medium at a range of angles relative to horizontal but centered about a median angle and means for detecting waves reflected from the stationary medium through a corresponding range of angles, and in which the calculating means includes means for performing a frequency analysis to determine the median frequency of detected reflected waves and for using such median frequency to calculate an approximation of the forward speed of the sportsman taking into consideration the median angle of transmission of the waves.

3. The speedometer defined in claim 2, in which the wave-transmitting means includes means for transmitting electromagnetic waves downward and forward relative to the direction of movement of the sportsman.

4. The speedometer defined in claim 1, in which the indicating means is remote from the calculating means and includes a head-mounted display.

5. The speedometer defined in claim 4, in which the head-mounted display includes a viewing reflector in which a display of the speed is seen by the sportsman, said reflector being mounted for movement with the head of the sportsman and spaced forward from the sportsman's eye.

6. The speedometer defined in claim 5, including optical elements for increasing the effective optical distance of the speed display to a distance at least several times the physical distance between the eye and the reflector.

7. The speedometer defined in claim 5, including a character generator for indicating the speed of the sportsman and positioned for viewing by reflection in the reflector.

8. The speedometer defined in claim 7, including an optical element for increasing the effective optical distance of characters generated by the character generator from the eye to a distance much greater than the physical distance of the path from the eye to the reflector to the character generator.

9. The speedometer defined in claim 8, in which the optical element is a lens mounted between the character generator and the reflector.

10. The speedometer defined in claim 7, in which the character generator includes a liquid crystal plate in transmission mode.

11. The speedometer defined in claim 10, including a color-filtering element for enhancing or removing color components of the remote background differently from light transmitted through the liquid crystal plate.

12. The speedometer defined in claim 11, in which the color-filtering element is positioned opposite the reflector from the adjacent eye of the sportsman.

13. The speedometer defined in claim 7, in which the reflector is semitransparent so that the remote background can be seen through the reflector.

14. The speedometer defined in claim 13, in which the reflector is a segment of a paraboloid having a focus closely adjacent to the character generator.

15. The speedometer defined in claim 13, in which the reflector is substantially a segment of a paraboloid.

16. The speedometer defined in claim 15, in which the reflector is positioned to encompass substantially the entire forward field of view of at least one eye of the sportsman.

17. The speedometer defined in claim 15, in which the axis of rotation of the paraboloid is closely adjacent to the character generator.

18. The speedometer defined in claim 7, in which the reflector is shaped to magnify the reflection of the character generator.

* * * * *

UNITED STATES PATENT AND TRADEMARK OFFICE
CERTIFICATE OF CORRECTION

PATENT NO. : 4,757,714
DATED : July 19, 1988
INVENTOR(S) : Peter K. Purdy and Kirk W. Beach It is certified that error appears in the above-identified patent and that said Letters Patent are hereby corrected as shown below:

ON THE TITLE PAGE:

Section [45] : insert an "*" after "1988";

After section [73] and before section [21] insert:

... [*]  Notice:  The portion of the term of this patent subsequent to Feb. 2, 2005, has been disclaimed. ...

Signed and Sealed this

Sixth Day of December, 1988

Attest:

DONALD J. QUIGG

*Attesting Officer*      *Commissioner of Patents and Trademarks*